(12) United States Patent
Robinson et al.

(10) Patent No.: US 8,542,432 B2
(45) Date of Patent: Sep. 24, 2013

(54) AUTOSTEREOSCOPIC DISPLAY SYSTEM WITH EFFICIENT PIXEL LAYOUT

(75) Inventors: Michael G. Robinson, Boulder, CO (US); Douglas J. McKnight, Boulder, CO (US)

(73) Assignee: RealD Inc., Beverly Hills, CA (US)

( * ) Notice: Subject to any disclaimer, the term of this patent is extended or adjusted under 35 U.S.C. 154(b) by 78 days.

(21) Appl. No.: 12/541,895

(22) Filed: Aug. 14, 2009

(65) Prior Publication Data

US 2010/0039698 A1    Feb. 18, 2010

Related U.S. Application Data

(60) Provisional application No. 61/089,009, filed on Aug. 14, 2008.

(51) Int. Cl.
G02F 1/29 (2006.01)

(52) U.S. Cl.
USPC .......................................... 359/316; 359/315

(58) Field of Classification Search
USPC .................. 359/316, 462, 463, 473
See application file for complete search history.

(56) References Cited

U.S. PATENT DOCUMENTS

| | | |
|---|---|---|
| 1,128,979 A | 2/1915 | Hess |
| 1,970,311 A | 8/1934 | Ives |
| 3,409,351 A | 11/1968 | Winnek |
| 4,542,958 A | 9/1985 | Young |
| 4,804,253 A | 2/1989 | Stewart |
| 4,807,978 A | 2/1989 | Grinberg et al. |
| 4,829,365 A | 5/1989 | Eichenlaub |
| 5,278,608 A | 1/1994 | Taylor |
| 5,349,419 A | 9/1994 | Taguchi et al. |
| 5,466,926 A | 11/1995 | Sasano et al. |
| 5,510,831 A | 4/1996 | Mayhew |
| 5,581,402 A | 12/1996 | Taylor |
| 5,588,526 A | 12/1996 | Fantone et al. |
| 5,697,006 A | 12/1997 | Taguchi et al. |
| 5,808,792 A | 9/1998 | Woodgate et al. |
| 5,850,580 A | 12/1998 | Taguchi et al. |
| 5,875,055 A | 2/1999 | Morishima et al. |
| 5,933,276 A | 8/1999 | Magee |
| 6,008,484 A | 12/1999 | Woodgate et al. |
| 6,023,315 A | 2/2000 | Harrold et al. |
| 6,055,013 A | 4/2000 | Woodgate et al. |
| 6,064,424 A | 5/2000 | Van Berkel et al. |
| 6,094,216 A | 7/2000 | Taniguchi et al. |

(Continued)

FOREIGN PATENT DOCUMENTS

WO    2005/006775 A1    1/2005

OTHER PUBLICATIONS

International Search Report and Written Opinion for PCT/US2009/053951 mailed Oct. 6, 2009.

*Primary Examiner* — Mahidere Sahle
(74) *Attorney, Agent, or Firm* — Baker & McKenzie LLP

(57) ABSTRACT

The present disclosure is directed to autostereoscopic display systems operable to provide increased number of views and related methods. One embodiment of the display systems comprises a light-modulating display panel comprising a first set of colored subpixels and a second set of colored subpixels, and the number of subpixels in the first set of colored subpixels is greater than the number of subpixels in the second set of colored subpixels. The display system further comprises a lenticular sheet disposed in light paths of the colored subpixels of the display panel.

16 Claims, 19 Drawing Sheets

(56) References Cited

U.S. PATENT DOCUMENTS

| | | |
|---|---|---|
| 6,118,584 A | 9/2000 | Van Berkel et al. |
| 6,224,214 B1 | 5/2001 | Martin et al. |
| 6,302,541 B1 | 10/2001 | Grossmann |
| 6,373,637 B1 | 4/2002 | Gulick, Jr. et al. |
| 6,456,340 B1 | 9/2002 | Margulis |
| 6,476,850 B1 | 11/2002 | Erbey |
| 6,481,849 B2 | 11/2002 | Martin et al. |
| 6,736,512 B2 | 5/2004 | Balogh |
| 6,801,243 B1 | 10/2004 | Van Berkel |
| 6,816,158 B1 | 11/2004 | Lemelson et al. |
| 6,825,985 B2 | 11/2004 | Brown et al. |
| 6,847,354 B2 | 1/2005 | Vranish |
| 6,859,240 B1 | 2/2005 | Brown et al. |
| 7,091,931 B2 | 8/2006 | Yoon |
| 7,239,293 B2 | 7/2007 | Perlin et al. |
| 7,365,908 B2 | 4/2008 | Dolgoff |
| 7,375,886 B2 | 5/2008 | Lipton et al. |
| 2001/0050686 A1 | 12/2001 | Allen |
| 2003/0016444 A1* | 1/2003 | Brown et al. ............... 359/462 |
| 2004/0046709 A1 | 3/2004 | Yoshino |
| 2004/0135741 A1 | 7/2004 | Tomisawa et al. |
| 2004/0263969 A1 | 12/2004 | Lipton et al. |
| 2006/0284974 A1 | 12/2006 | Lipton et al. |
| 2007/0035829 A1 | 2/2007 | Woodgate et al. |
| 2007/0109401 A1 | 5/2007 | Lipton et al. |
| 2008/0079662 A1 | 4/2008 | Saishu et al. |

\* cited by examiner

AUTOSTEREOSCOPIC DISPLAY SYSTEM WITH EFFICIENT PIXEL LAYOUT

CROSS-REFERENCE TO RELATED APPLICATION

This application claims priority to U.S. Prov. Appl. Ser. No. 61/089,009 filed on Aug. 14, 2008, which is hereby incorporated by reference in its entirety for all purposes.

BACKGROUND

1. Technical Field

The present disclosure generally relates to autostereoscopic display systems, and more particularly to autostereoscopic display systems comprising micro-optical arrays.

2. Background

Autostereoscopic displays have a long history dating back many decades. The basic principle of autostereoscopic display includes inserting a micro-optical array between a 2D display and the viewer so as to provide angularly dependent images. These underlying pixels include spatially-separated modulating elements of different colors (e.g. red, green, and blue). Relying on the refractive property of the lenses in the optical array, the optical array is operable to "hide" certain pixels at any given viewing angle and provide an image only with those pixels that remain visible. As such, the visible pixels are selectively chosen to create effective pixels for each view.

Conventional autostereoscopic displays include a conventional LCD panel and a cylindrical lens array. Display pixels include a triad of rectangular R, G and B subpixels aligned in contiguous columns. A cylindrical lens array is introduced directly in front of the display to provide multiple views by selectively imaging the pixels in the plane of the viewer.

SUMMARY

One embodiment of the present disclosure is directed to an autostereoscopic display system comprising a light-modulating display panel, which includes a first set of colored subpixels and a second set of colored subpixels. The number of subpixels in the first set of colored subpixels is greater than the number of subpixels in the second set of colored subpixels. The autostereoscopic display system also includes a lenticular sheet disposed in light paths of the colored subpixels of the display panel.

In some embodiments, the first set of colored subpixels comprises colored subpixels of the same color. In some embodiments, the second set of colored subpixels comprises colored subpixels of the same color. In one embodiment, the colors of the first and second sets of colored subpixels are different. In a preferred embodiment, the luminance of the color of the first set of colored subpixels is higher than the luminance of the color of the second set of colored subpixels.

In some embodiments, the colored subpixels are arranged in a pixel array comprising a plurality of rows and columns, and further wherein the lenticular sheet comprises a lens array having a plurality of rows and columns that are aligned at oblique angles relative to the rows and columns of the pixel array.

The present disclosure also provides a light-modulating display panel comprising a plurality of oblique subpixels arranged in a pixel array, the pixel array comprising columns and rows. The plurality of oblique subpixels comprise a first set of colored subpixels and a second set of colored subpixels. Additionally, the number of subpixels in the first set of colored subpixels is greater than the number of subpixels in the second set of colored subpixels.

The present disclosure includes a method of providing stereroscopic images. The method includes providing a light-modulating display panel comprising a first set of colored subpixels and a second set of colored subpixels, in which the number of subpixels in the first set of colored subpixels is greater than the number of subpixels in the second set of colored subpixels. The method further includes disposing a lenticular sheet in light paths of the colored subpixels of the display panel and outputting images from the light-modulating display panel through the lenticular sheet.

BRIEF DESCRIPTION OF THE DRAWINGS

Embodiments are illustrated by way of example in the accompanying figures, in which like reference numbers indicate similar parts, and in which.

DETAILED DESCRIPTION

Conventional autostereoscopic displays employ an underlying display panel with a high pixel count to produce high-quality images at many viewing angles. The high pixel count allows for an increased number of views, and the advantages of increased number of views include higher resolution, larger viewing zones (i.e. regions where views are continuous) and greater depth perception. The high pixel count that allows for high quality images, however, significantly exceeds that of the latest display panels. Moreover, a large number of underlying pixels imply smaller aperture ratios, and accordingly, the pixel shape will have a significant impact on the display performance. In these respects, the present disclosure provides autostereoscopic display systems for producing high quality images despite the constraints on pixel density in the currently available technology. More specifically, the present disclosure includes embodiments directed to the efficient arrangement and design of the colored subpixels of a display panel to provide an increased number of views within a lenticular autostereoscopic system.

Figure 1:
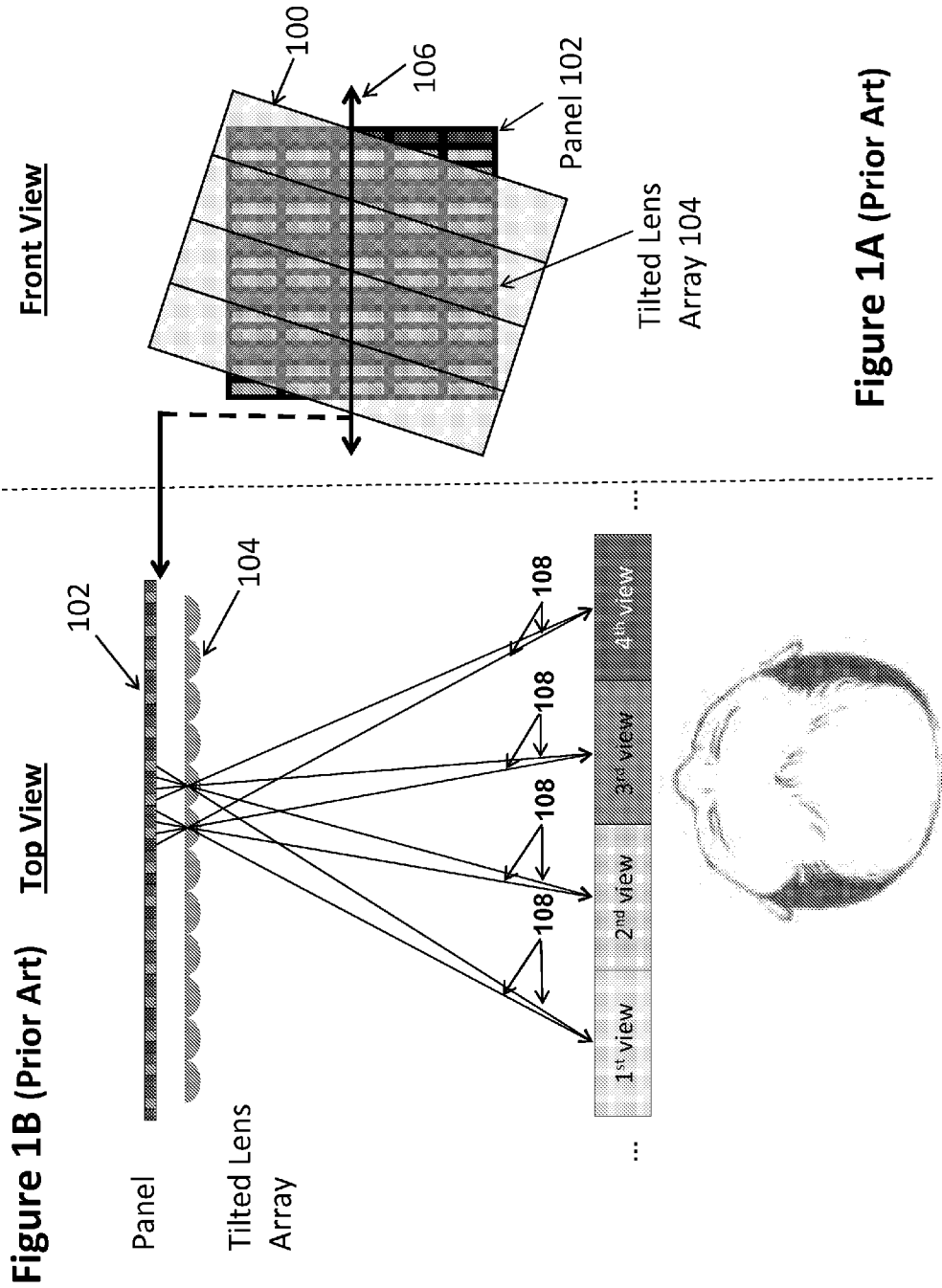
FIG. 1A is a frontal view of a conventional lenticular display system.
FIG. 1B is a top view of the conventional lenticular display system shown in FIG. 1A.

FIG. 1A is a frontal view of a conventional lenticular autostereoscopic display system 100, which includes a conventional display panel 102 such as an LCD panel and a tilted cylindrical lens array 104 disposed directly in front of the panel 102. As such, the panel 102 is viewed through the lenses (not shown) in the cylindrical lens array 104. The lenses are operable to direct the light from pixels of the panel 102 such that only some portions of the panel 102 are seen at any given viewing angle. FIG. 1B is the top view of the lenticular autostereoscopic display 100, and it illustrates the light paths in a horizontal viewing plane that intersects the panel 102 at line 106. As shown by the central rays 108 in FIG. 1B, the lenses in the lens array 104 are operable to effectively image the pixels in the viewing plane. This produces viewing regions where superimposed sets of these pixel images are formed. For any given viewing plane, the viewing regions are discrete.

Figure 2:
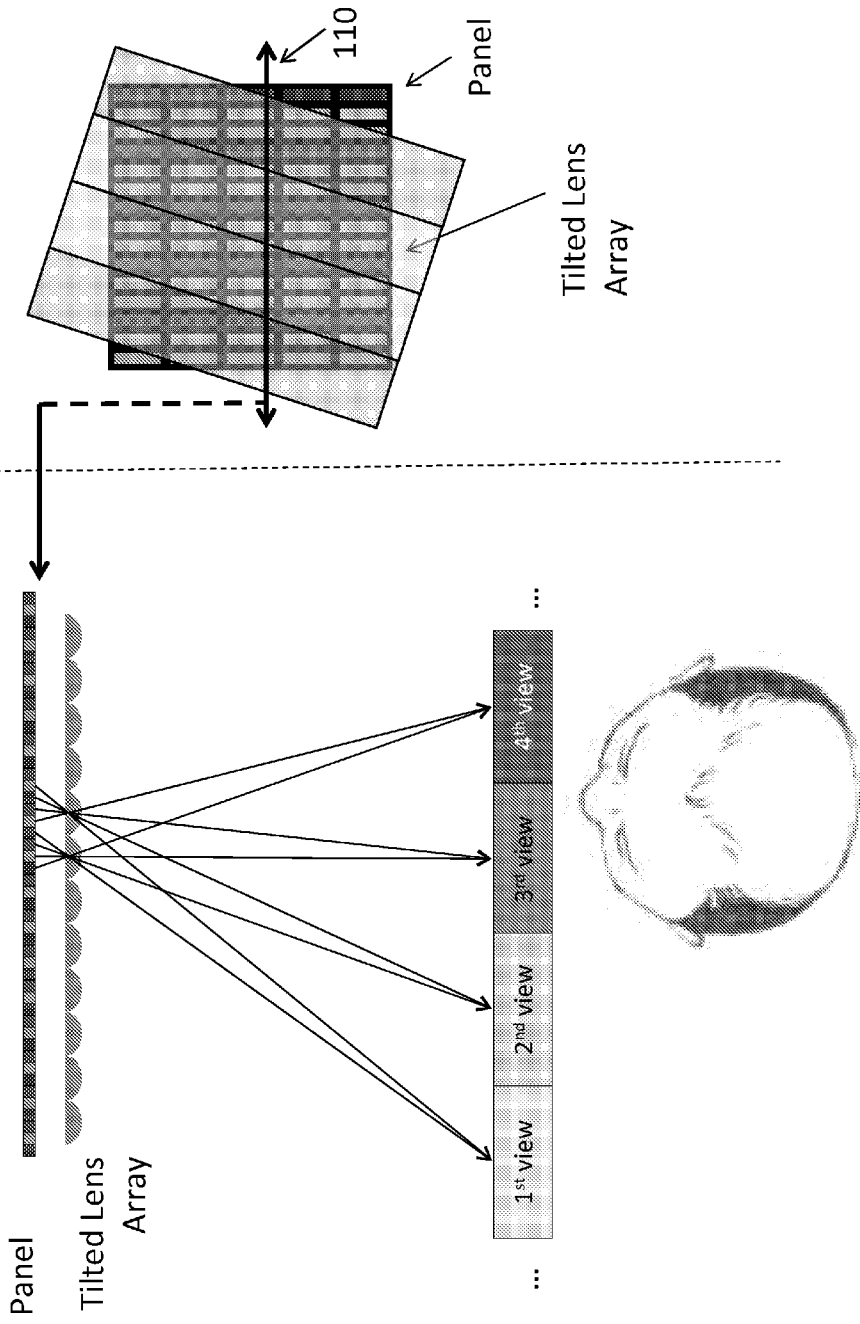
FIG. 2 is a schematic illustration of the conventional lenticular display system shown in FIG. 1A.
Figure 3:
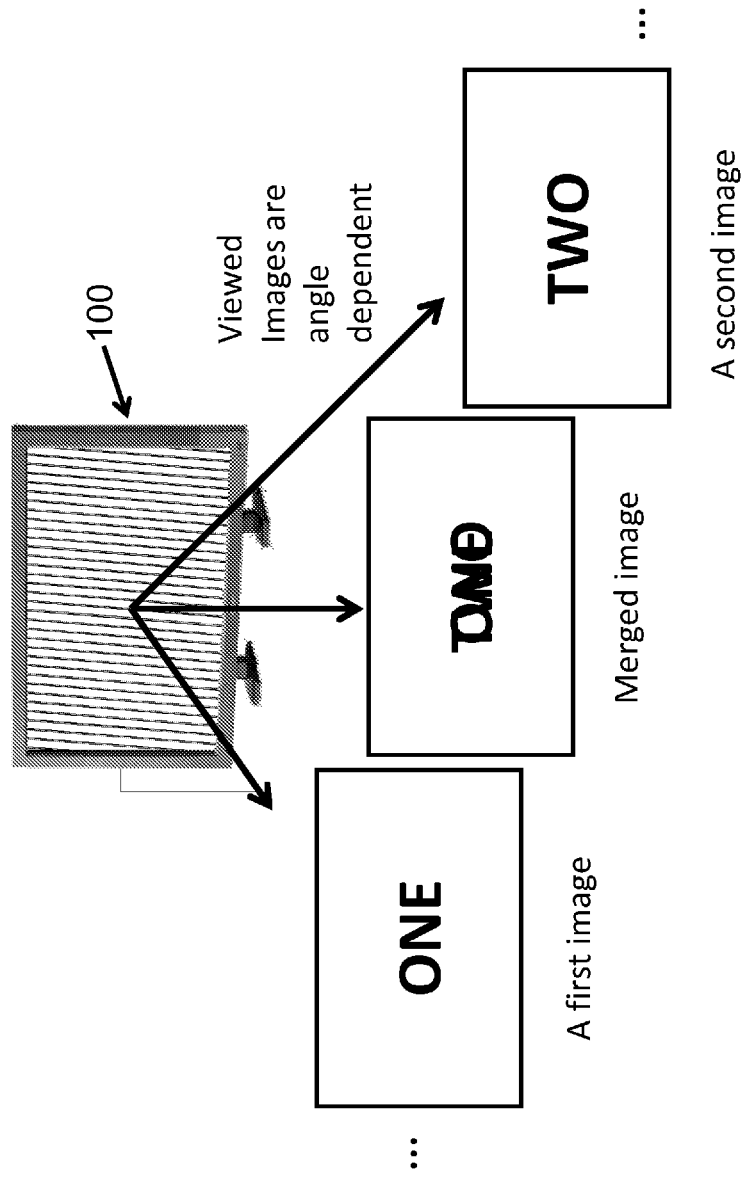
FIG. 3 is another schematic illustration of the conventional lenticular display system shown in FIG. 1A.

For conventional displays that include a lens array that is not tilted, the viewer sees either a set of image subpixels or the boundary between those subpixels. In some embodiments, this boundary is black (the so-called 'black matrix') and highly attenuates the panel brightness leading to undesirable angular and spatial intensity variations. Having tilted lenses mitigates this problem by averaging the boundary attenuations within the viewing zone. Effectively, with tilted lenses, the separate views shift for different viewing planes passing though the same pixels. FIG. 2 shows that at a different viewing plane that intersects the panel 102 at line 110, the viewing angles for the same views are altered relative to the viewing angles at the viewing plane at line 106. This gradual subpixel shift acts to merge neighbor views such that a viewer sees a gradual change in views as a function of angle. FIG. 3 illustrates what a viewer would experience when viewing the display 100 as a function of viewing position.

Figure 4:
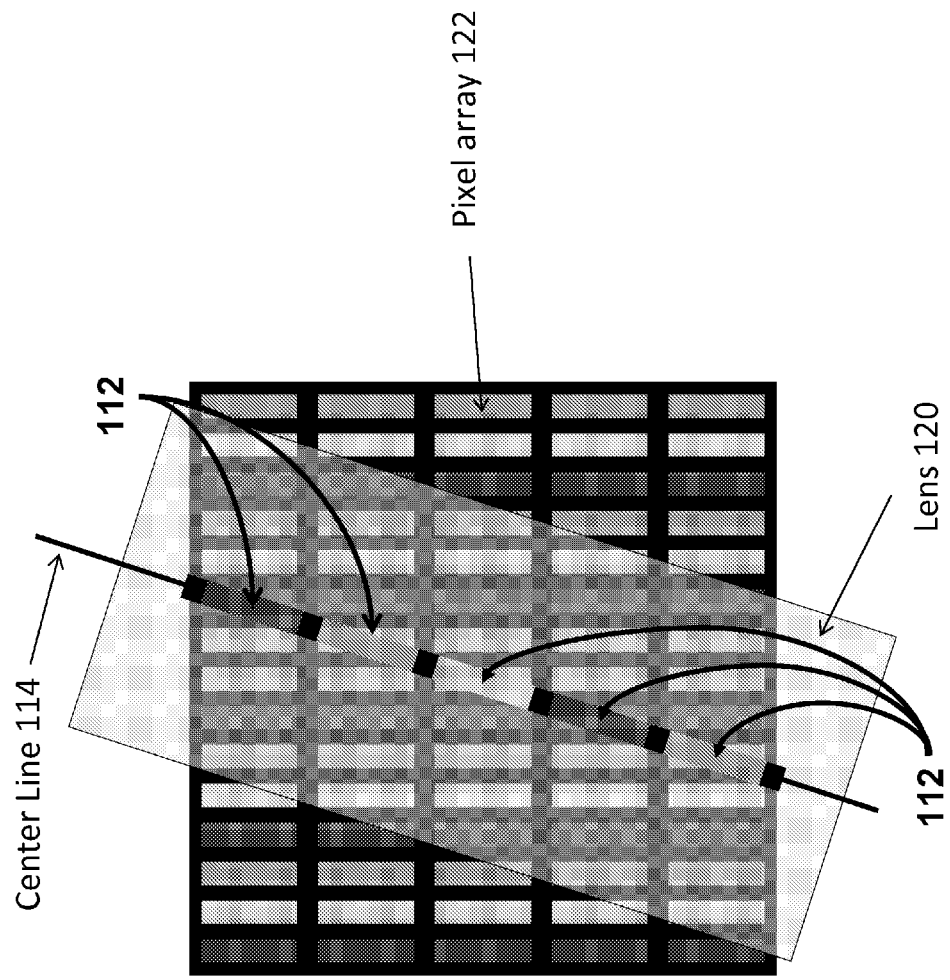
FIG. 4 is a focused view of the pixel array and lens array of the conventional lenticular display system shown in FIG. 1A.
Figure 5:
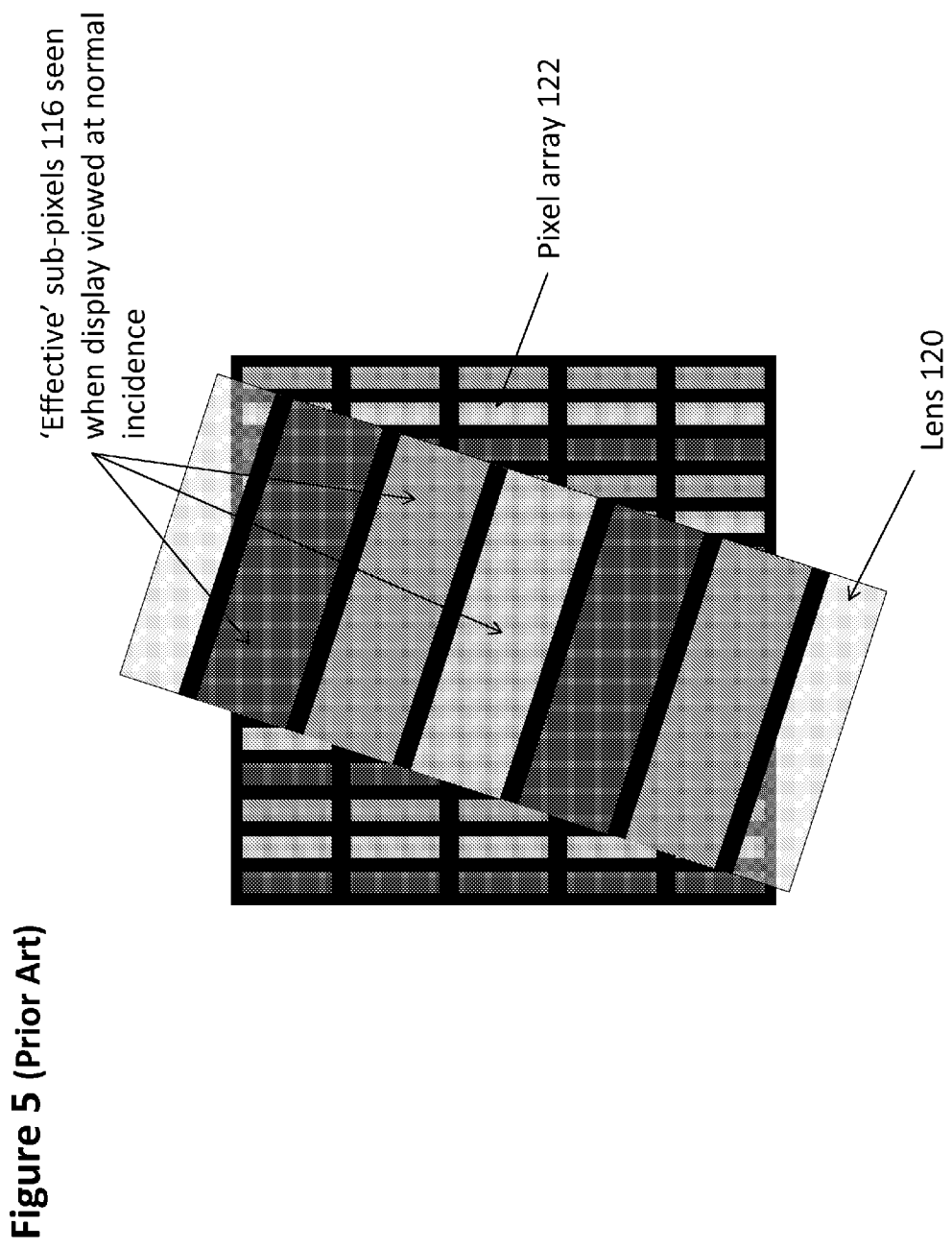
FIG. 5 shows the effective pixels as seen by a viewer in the conventional lenticular display system shown in FIG. 1A.

The effective pixels seen by a distant viewer at any given position can be determined as follows. Light passing though the center of a lens is not deflected. Color and intensity seen along the lens center line is then that of the underlying subpixels directly beneath. As shown in FIG. 4, the viewer would observe the color and intensity of the underlying subpixels 112 that are intersected by the lens center line 114 projected onto the pixel array 122 from the viewer's perspective. The lens 120 then directs light from this intersecting region toward the viewer, effectively filling the lens 120 and creating effective pixels 116 as shown in FIG. 5. Light emanating from pixels not intersected by this projected center line 114 is deflected away and seen at different viewing angles. The lens 120 is filled in a direction normal to its center line 114 as shown in FIG. 5.

Figure 6:
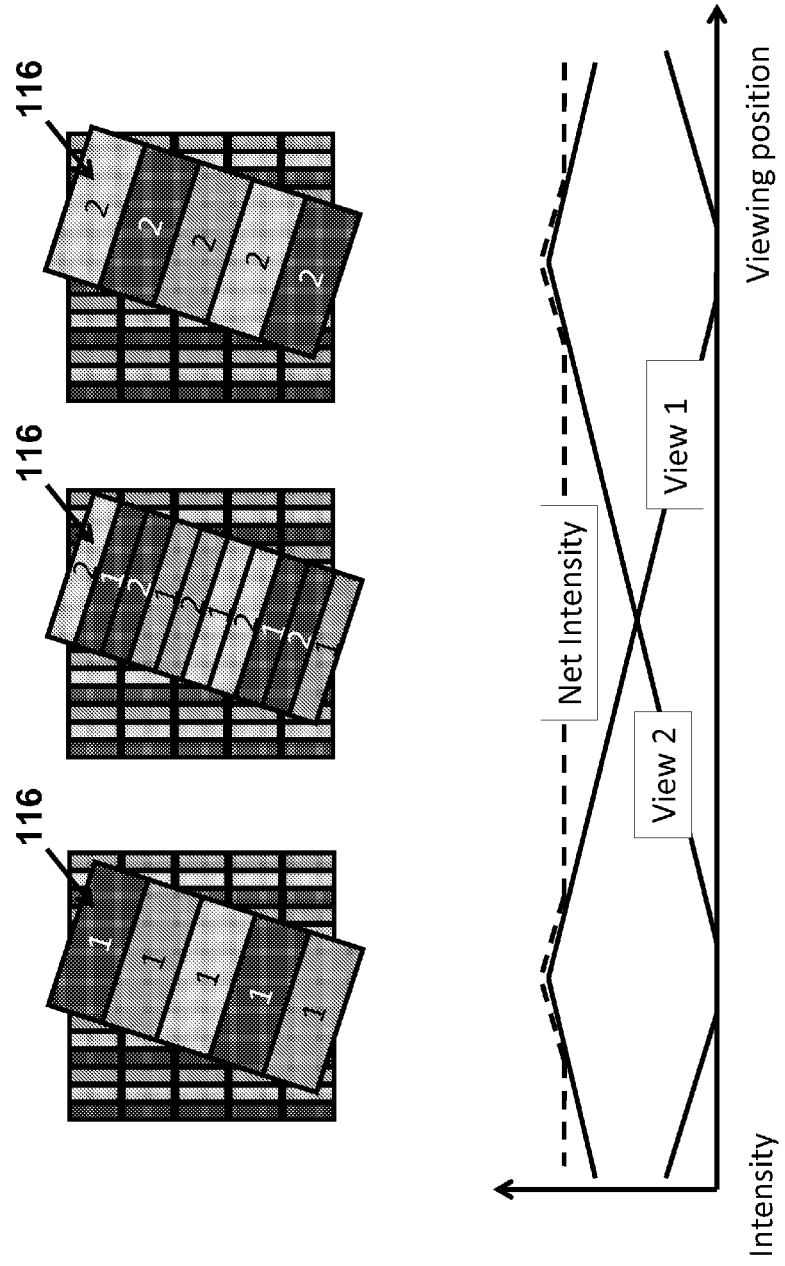
FIG. 6 illustrates the effective pixels seen as a function of viewing angle and the intensity variations of subpixel sets associated with each view in the conventional lenticular display system shown in FIG. 1A.

FIG. 6 shows how the effective pixels 116 change as a function of viewing position, and hence viewing angle. Geometry dictates the movement of the projected lens center lines 114 since the lens array 104 is tilted relative to the pixel array 122. FIG. 6 helps to illustrate the merging of the views as a function of viewing angle. Different views appear continuous with view angle until individual lenses image subpixels that lie under an adjacent lens. Views are then reset and replicated. The region containing a complete set of continuous views is called the viewing zone, with number of views within a viewing zone being equal to the number of subpixels that lie beneath a lens in the horizontal viewing plane. Viewing zone size is determined by the focal length of the lens, but to provide stereoscopic imaging, at least two views are included in the angle subtended by the viewer's eyes. A desirable large viewing zone is conventionally provided by increasing the number of subpixels beneath the lens 120 to increase the number of views. To provide for this, smaller and smaller subpixels are being fabricated, but, due to the constraints on pixel density, though a better solution would be a smarter allocation of more feasibly sized subpixels.

FIG. 6 also shows the undesirable angle-dependent display intensity for displays with idealized rectangular subpixels. These artifacts become more obvious at certain distances since they manifest themselves as periodic intensity variations or moiré fringes that move with viewing position. This can be minimized by designing the subpixel masking with autostereoscopy in mind. The choice of the lens tilt angle together with the pitch of the lens array (i.e. the width of the lens in the lens array) acts to affect underlying moiré fringing and cross-talk between neighboring images. An undesirable result of tilting the lenses, however, is the effective pixel as seen by the viewer is also tilted, resulting in poor text rendition.

The present disclosure is directed to allocating subpixels efficiently by modifying the density of one set of subpixels relative to that of other sets of subpixels while providing good viewing resolution. In one embodiment, the density of the green subpixels are increased. In one particular embodiment, the density of the green subpixels are increased relative to the density of red and blue subpixels.

It is well known that the resolving power of the human eyes is much better in the green region of the visible spectrum as compared with red and blue regions of the visible spectrum. This is the basis behind the popular 'Bayer' mosaic pixel pattern used in digital CCD camera chips.

Figure 7:
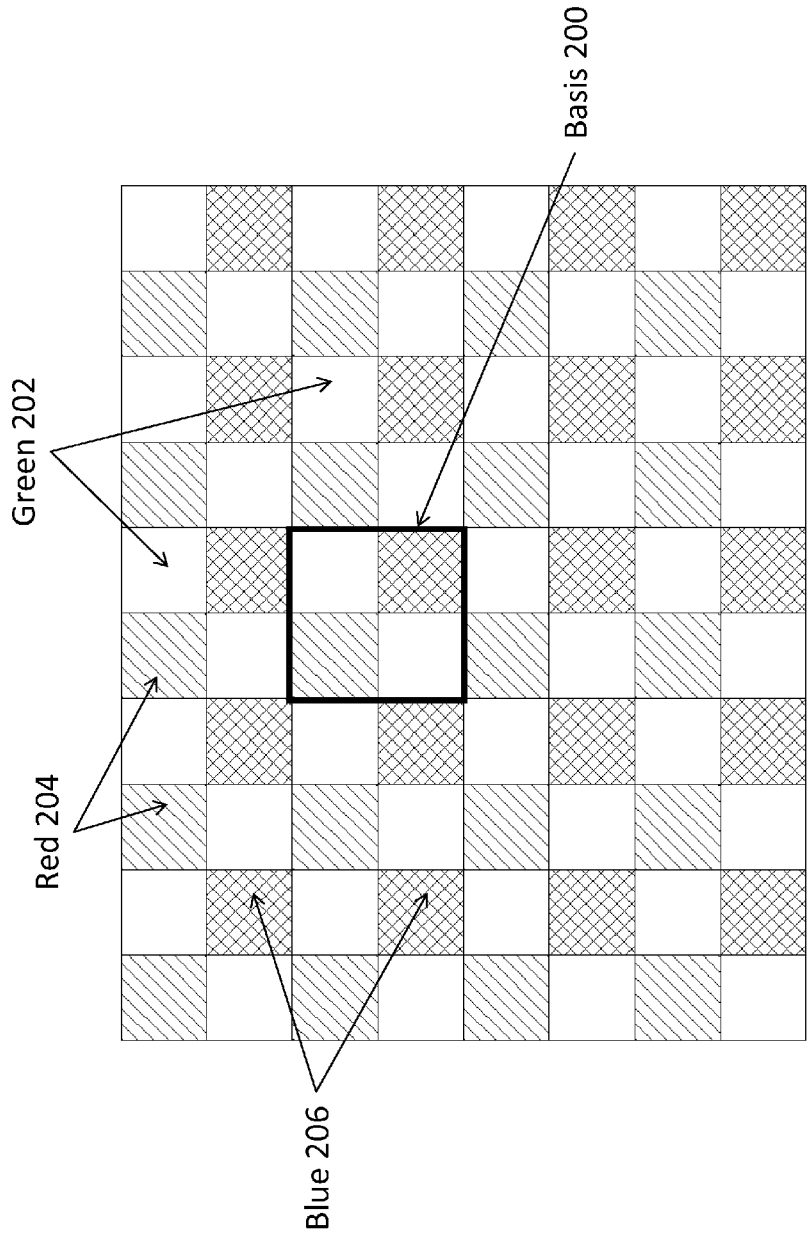
FIG. 7 shows a 'Bayer' subpixel arrangement used in conventional capture systems.

Shown in FIG. 7, this pattern has a basis block 200 of four subpixels containing two green subpixels 202 for every single red and blue subpixels 204 and 206. Lowering resolution in the lower luminance subpixels (i.e. red and blue) does not significantly reduce the quality of an image since human perception is most acute for the high-luminance green light. This approach has been successful for pixel-limited capture systems and has been shown to be acceptable in displays that utilize similar patterns for lower costs. The design considerations for these conventional applications, however, are different from the design considerations for autostereoscopic display systems. Here, in a clearly distinct manner, emphasis is placed on increasing the pixel count to provide an autostereoscopic display system with as many views as possible.

There are several design considerations unique to autostereoscopic display systems. The viewing zone of lenticular autostereoscopic displays is dictated by the horizontal spatial resolution, and accordingly, it is desirable to have as many subpixels as possible beneath a lens in a horizontal line with a continuous color. The color constraints avoids local color changes as a function of viewing angle. Furthermore, it is beneficial to have striped color filters in the underlying panel as this is compatible with present color filter array (CFA) manufacturing.

Figure 8:
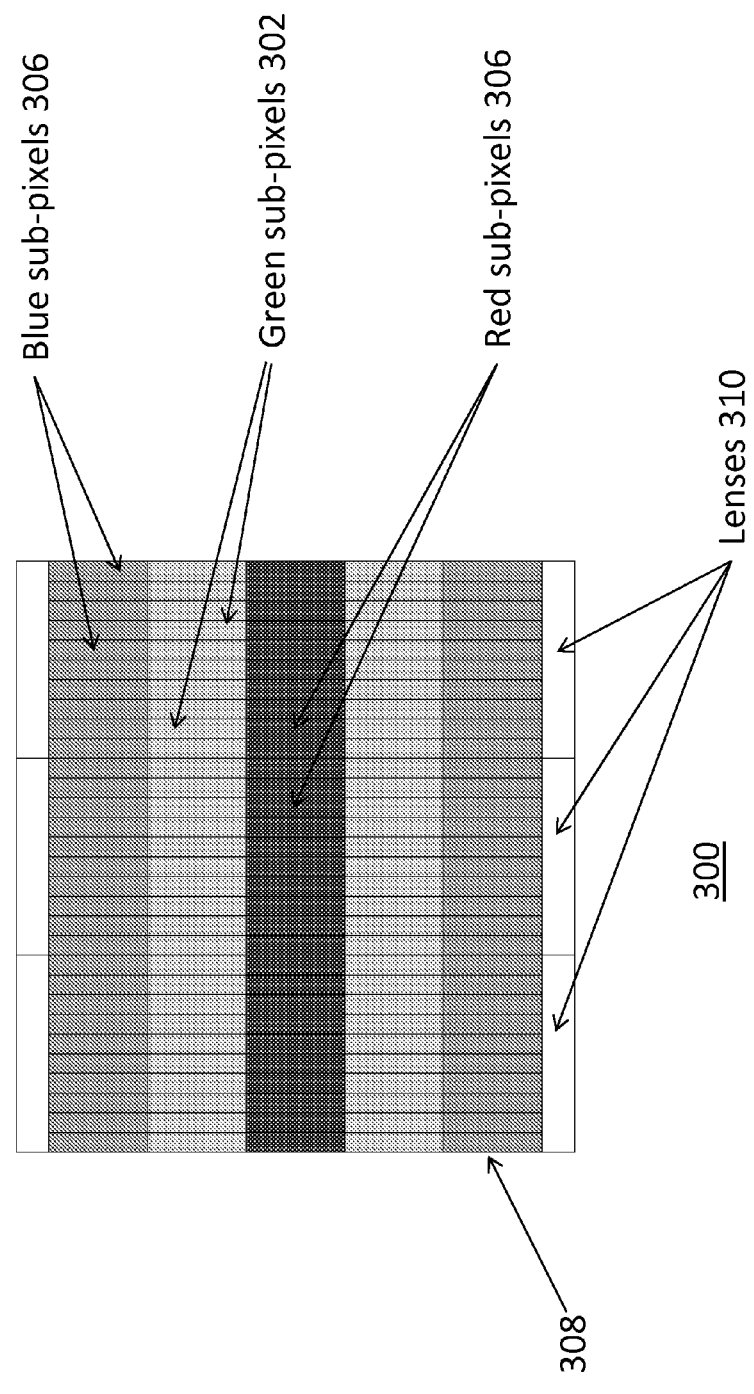
FIG. 8 shows a first subpixel arrangement for an autostereoscopic display system according to the present disclosure.

One exemplary embodiment of the present disclosure is shown in FIG. 8, in which a display system 300 comprises colored subpixels 302, 304, and 306 in the underlying display light-modulating panel 308. The colored subpixels 302, 304, and 306 are arranged to provide colored stripes according to a "RGBGRGBG . . . " pattern. The overlaying lenses 310 provide views that have the same colored striped pattern in the vertical dimension (i.e. has same vertical resolution), but has an effective pixel pitch (i.e. the width of the individual pixels in a pixel array) equivalent to that of the lens pitch in the horizontal. The effective green sampling is thus on a uniform square grid whereas the red and blue sampling is decreased by a factor of two in the vertical dimension only.

Figure 9:
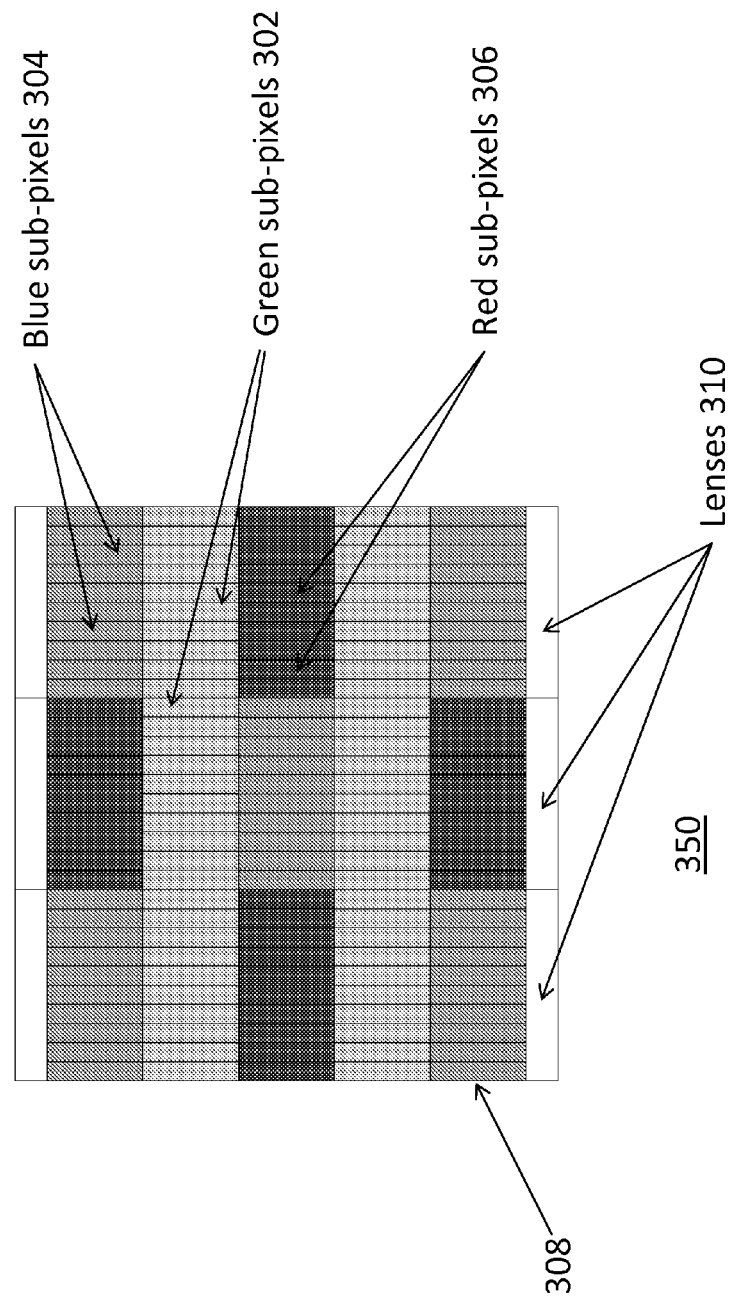
FIG. 9 illustrates a second subpixel arrangement for an autostereoscopic display system according to the present disclosure.

In autostereoscopic displays, it may be desirable to have both vertical and horizontal symmetry in sampling, and the exemplary embodiment shown in FIG. 9 may be preferable. The display system 350 in FIG. 9 includes colored subpixels 302, 304, and 306 arranged to provide continuous green stripes with alternating red and blue color regions. Here, uniform square grid sampling is achieved for all colors with the red and blue grids being rotated by 45°.

One of ordinary skill in the art will appreciate that in the discussions with respect to FIGS. 8 and 9, it has been assumed that the underlying colored pixels are ideal in that they have no discernable boundaries or 'black-matrix'. The imaging lenses, however, can highlight the surround of more realistic pixels in an undesirable manner, which give rise to the desirability of modifying the pixel structure.

Figure 10:
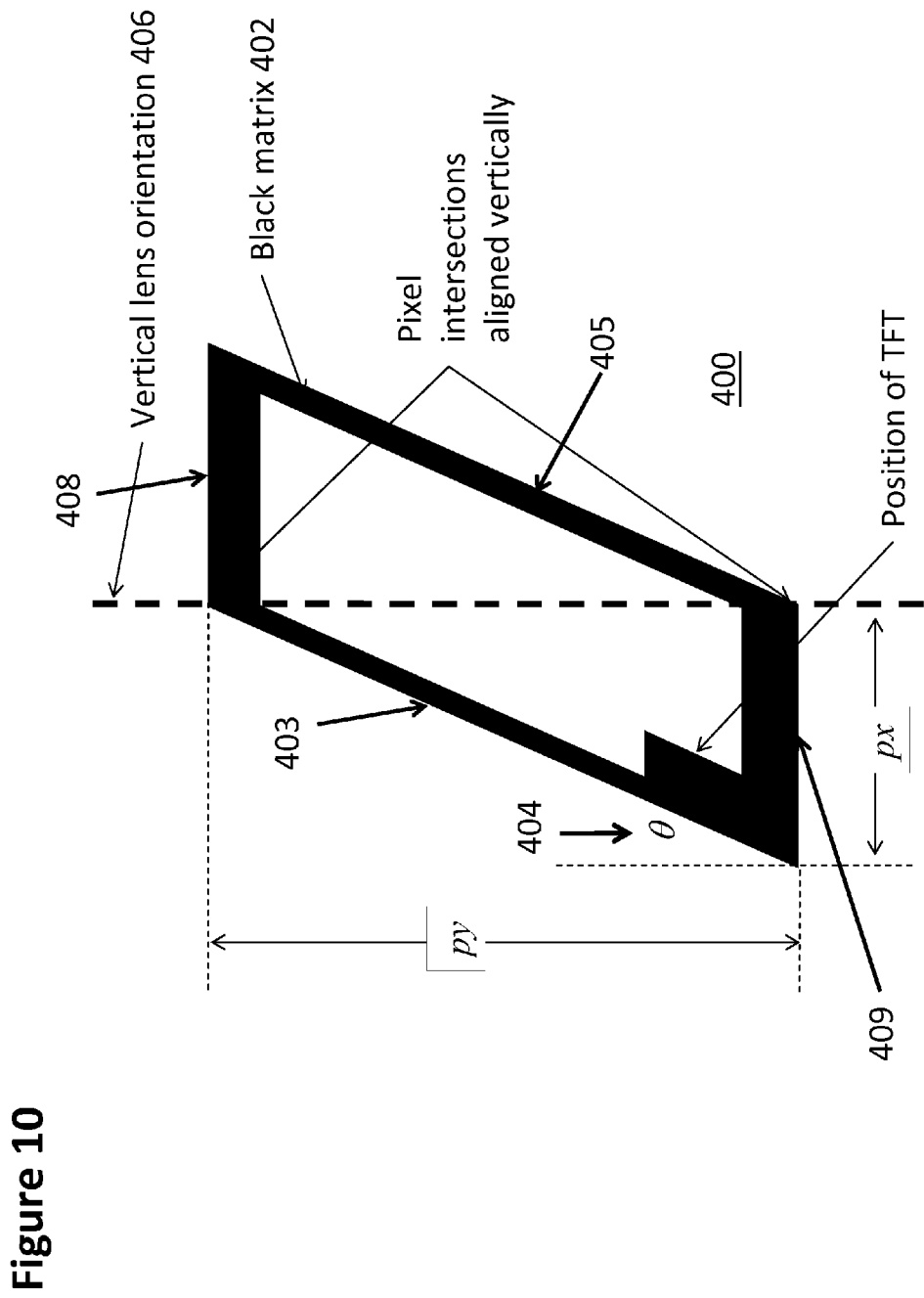
FIG. 10 is a schematic illustration of an oblique pixel according to the present disclosure.
Figure 11:
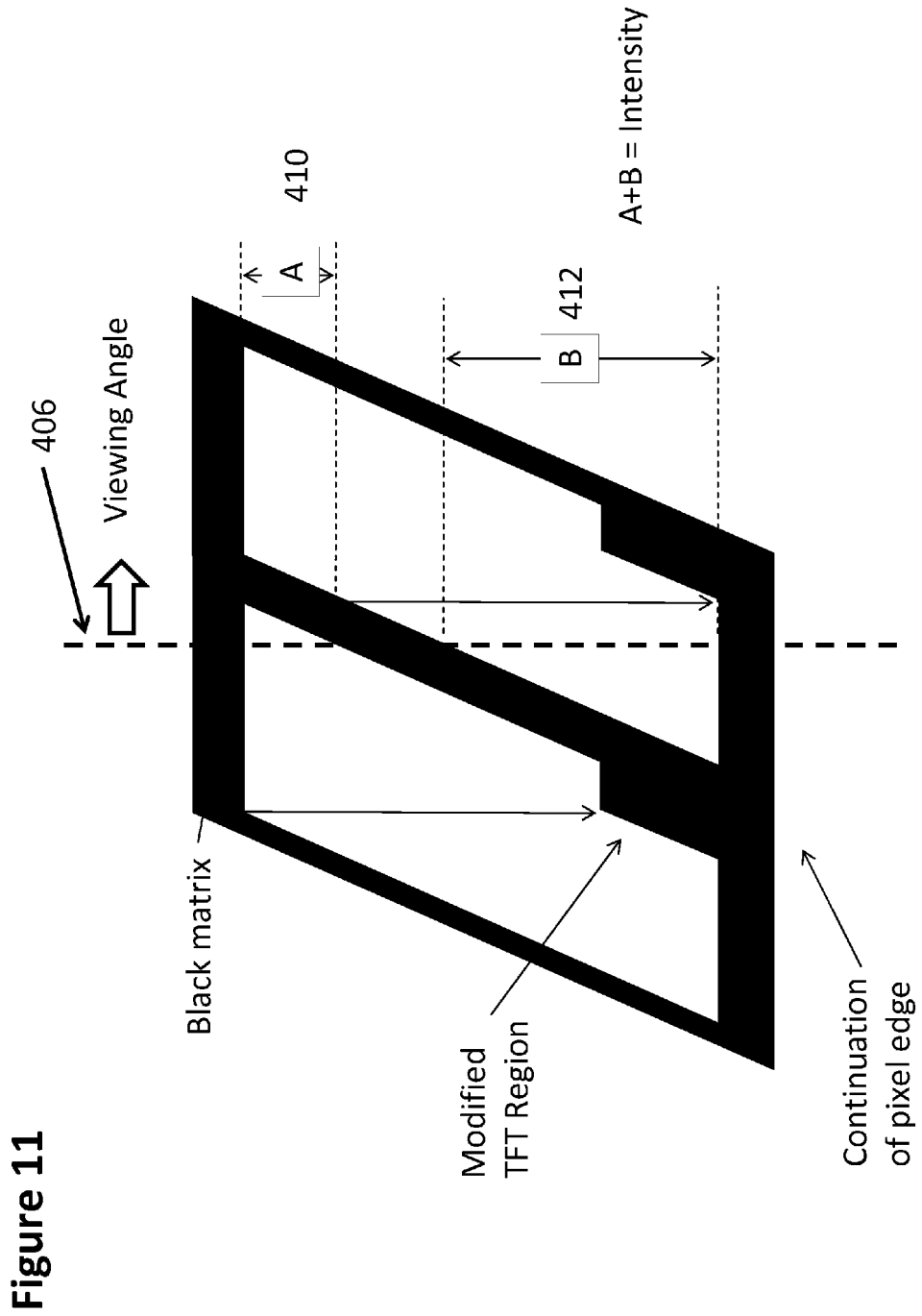
FIG. 11 illustrates another embodiment of oblique pixels according to the present disclosure.
Figure 12:
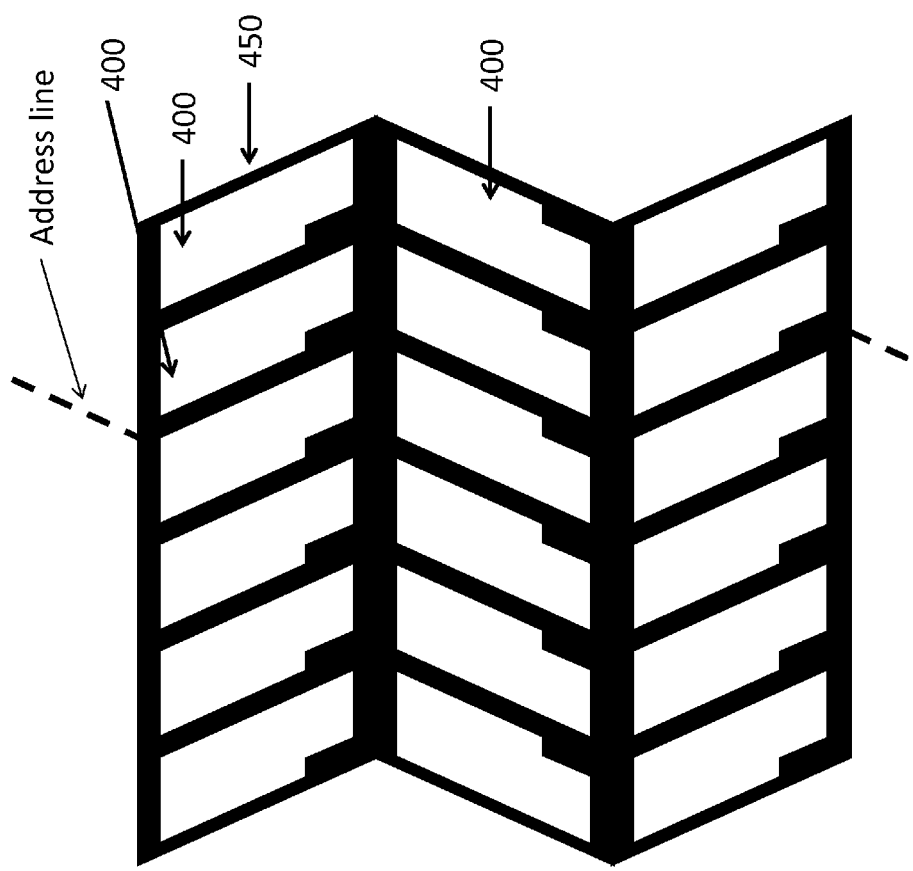
FIG. 12 shows an array of oblique pixels according to the present disclosure.

Turning now to FIGS. 10-12, embodiments illustrated herein address non-ideal subpixels, in which a 'black matrix' surround is present. Conventionally, as discussed above, the lenses are tilted with respect to the pixel edge to avoid spatial and angular intensity variations. A preferred alternative is to use oblique underlying pixels and retain the vertical lens orientation as shown in FIG. 10. The oblique subpixel 400 includes a black matrix boundary 402, which may include address lines or other electrical components of a display panel. The address lines and the electrical components are painted black, thus providing the black color appearance.

In some embodiments, the oblique subpixel 400 is shaped substantially like a parallelogram, having two pairs of substantially parallel sides, which form internally oblique angles. For example, as illustrated in FIG. 10, sides 403 and 405 are substantially parallel, and sides 408 and 409 are also substantially parallel. In some embodiments, the shape of the subpixel 400 corresponds to a rhomboid, whose pairs of parallel sides have different length. For example, the long sides 403 and 405 and short sides 408 and 409 have different lengths as shown in FIG. 10.

The side 403 of the oblique subpixel 400 is aligned at a slant angle θ 404 relative to an axis parallel to the lens center line 406. Allowing that such an oblique subpixel 400 and a non-tiled lens may allow the, effective pixels (not shown) to remain horizontally- and vertically-aligned relative to the viewer, thereby allowing for good text rendition. In some embodiments, it is preferred that the slant angle θ 404 is chosen to allow for low moiré fringing. It is also desirable in some embodiments to have the obtuse internal corners of the pixel 400 to be closely aligned in the vertical direction as shown in FIG. 10, which would help to avoid severe merging between next nearest neighbor views. In general, these two design preferences compete with each other, and some embodiments may have noticeable moiré artifacts. To minimize such effects, the black matrix boundary 402 of the subpixel 400 may be modified.

The intensity variation as a function of viewing angle is determined by the length of the intersection between the projected lens center line and the underlying subpixel apertures. Accordingly, as illustrated in FIG. 11, it is desirable to shape the pixel 400 such that the sum of lengths 410 and 412—the intersecting portions of the lens center line 406—to be constant. This would allow the intensity to be independent of the horizontal location of the center line 406. While such subpixels 400 shaped to have minimized intensity variation are desirable, manufacturing limitations and tolerances may prevent the fabrication of the most preferable pixel structures. To be more tolerant of manufacturing practices, a slightly increased slant angle θ 404 can be introduced to suppress moiré effects to an acceptable level.

Shown in FIG. 12 is an embodiment of a pixel array 450 comprising a plurality of oblique subpixels 400 assembled in a tessellation pattern, and the pixel array 450 includes a plurality of columns and rows. It is to be appreciated that the subpixels 400 may be any subpixels described in the present disclosure or constructed according to the principles of the present disclosure. In some embodiments, the columns and rows of the pixel array 450 zigzag as shown in FIG. 12 according to a "herring-bone" pattern. In other words, the slant direction of the subpixels in the pixel array 450 alternates between adjacent rows. In one exemplary embodiment, the subpixels 400 are aligned such that the dimensions of neighboring subpixels in the same column are symmetrical across their adjacent sides. In another exemplary embodiment, the neighboring subpixels 400 in the same row are aligned such that a pair of parallel sides from each subpixel 400 are aligned along axes that are parallel to a longitudinal axis defined by a row of the pixel array 450.

Figure 13:
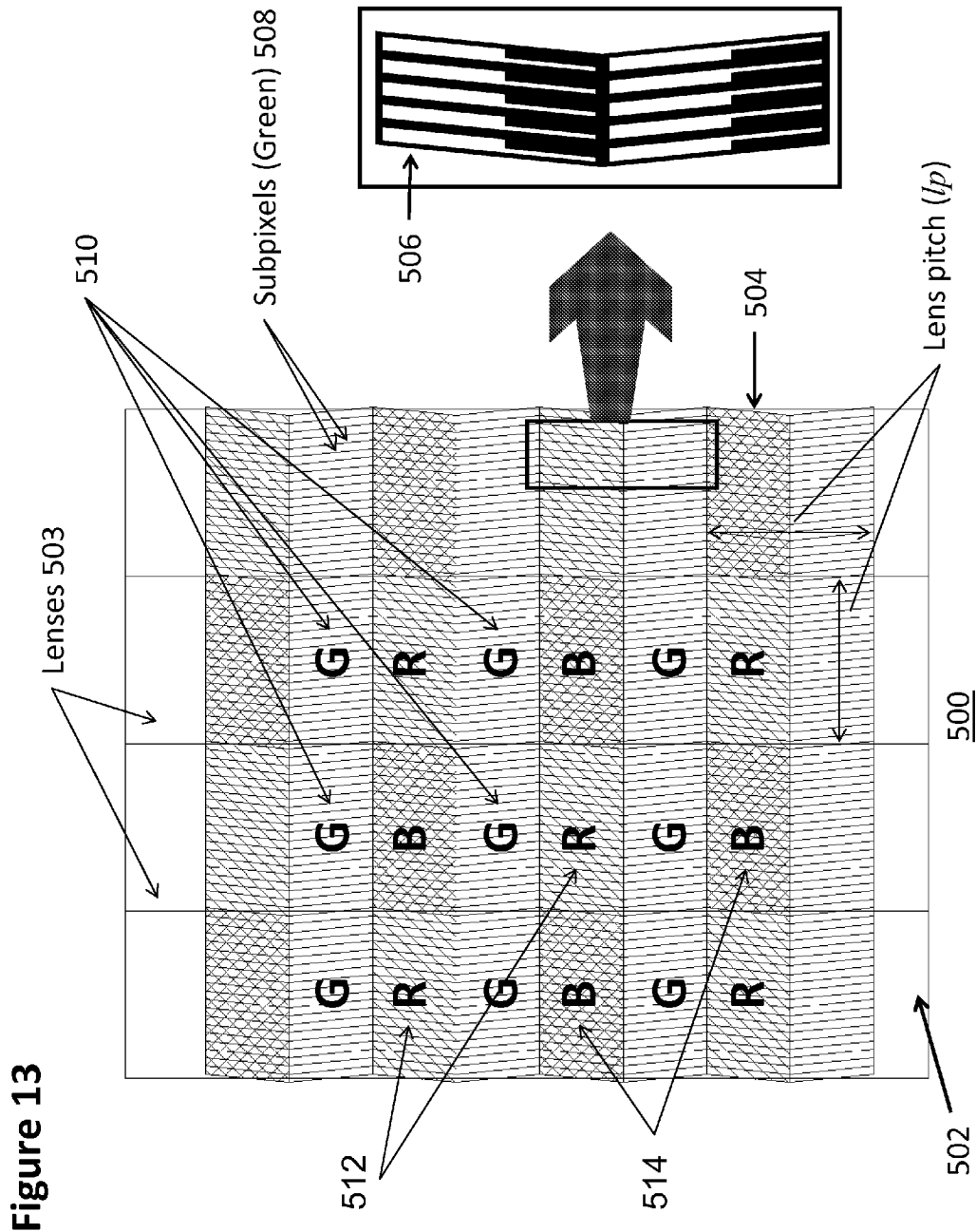
FIG. 13 illustrates a preferred embodiment of the autostereoscopic display system of the present disclosure.

A preferred embodiment is shown in FIG. 13, which is a perspective view of an autostereoscopic display system 500. The display system 500 comprises a non-titled, cylindrical lens array 502 disposed light paths of the subpixels 505 of a light-modulating display panel 504. Display subpixels 506 of the panel 504 are grouped in colored blocks located at the focal distance beneath the lenses 503 of the lens array 502, and each block has a width that is substantial the same as the width of the lenses in the lens array 502. The lens sampling of the display system 500 provides effective pixels of a size and color of the underlying groups that remain substantially unchanged as a function of viewing angle. For example, FIG. 13 shows a plurality of green effective pixels 510 formed by continuous green pixels 508. In such embodiment, the aspect ratio of the effective colored pixels 510 is 2:1. In alternative embodiments, the aspect ratio of the effective colored pixels can be varied to satisfy the various viewing performance of the display system 500.

The effective views of the display system 500 comprise green effective pixels 510 that form a square sampling array. The effective views further comprise red and blue effective pixels 512 and 514 that form two diagonal sampling red and blue arrays, which are interspersed between the square green sampling array. It is to be appreciated that in other embodiments, the effective pixels of each color can form sampling arrays of varies geometry, such rectangular or herring-bone arrays.

Referring back to the embodiment illustrated in FIG. 13, the resolution provided by the green array is greater than that of the blue and red arrays for all viewing angles other than angles close to zero, where they are near equivalent. This provides for good text rendition. The continuous horizontal green pixels 508 maximize the luminance sampling in the horizontal dimension, thereby providing an increased number of independent views. Furthermore, continuous colored subpixels helps lower fabrication costs associated with high resolution color filter arrays.

The underlying subpixels 506 of the display panel 504 are oblique and tiled according to the 'herring-bone' pattern as discussed with respect to FIG. 12. Such an arrangement of the subpixels 506 allows for minimizing issues associated with non-standard connections to the address lines. Masking for the panel 504 would preferably be designed to minimize angular and/or spatial intensity variations within manufacturing constraints. In some embodiments, the slant angles are between $$\tan^{-1}\left(\frac{px}{py}\right) \text{ and } \tan^{-1}\left(\frac{2pw}{py}\right),$$

where px and py are the widths of the sides of the underlying subpixels 506 in the horizontal and vertical directions, respectively. The value of px and py are determined by the desired viewing performance. In some embodiments, px is chosen to be half the minimum resolution of the eye at a typical viewing distance, and py is chosen to be the minimum possible given the constrains of manufacture and aperture ratio, the latter being traded with optical efficiency. The smaller py, the more independent views there are which can be used to increase left to right eye disparity (i.e. more depth) or increase the viewing zone.

In the implementation of the embodiment described in FIG. 13, it is possible to determine typical feature sizes in the following manner. For a 60" diagonal panel viewed at 2-3 meters, the lens size (which determines the pixel width) is preferably close to the resolution of the eye, i.e. subtend an angle of ~2°. This puts a preferred upper limit on the lens pitch lp of ~1 mm. At 2-3 meters, the eyes' subtend ~2° angle with respect to the display suggests a preferred maximum angle per view of ~1°. For a display that has a 30° viewing zone, 30 views are preferred, making the physical pitch of the subpixels ≤30 μm which is possible with current technology. Expected future improvement should allow greater resolutions with corresponding enlarged viewing zones and view densities consistent with 3D HDTV.

The preferred embodiment, as illustrated in FIG. 13 is not specific to any one color separated display technology, although the masking approaches considered are mostly applicable to LCDs. It is to be appreciated that the principles disclosed herein may be applied to other display technologies, including organic light emitting diode (OLED), plasma (PDP), Field emission (FED), etc.

Figure 14:
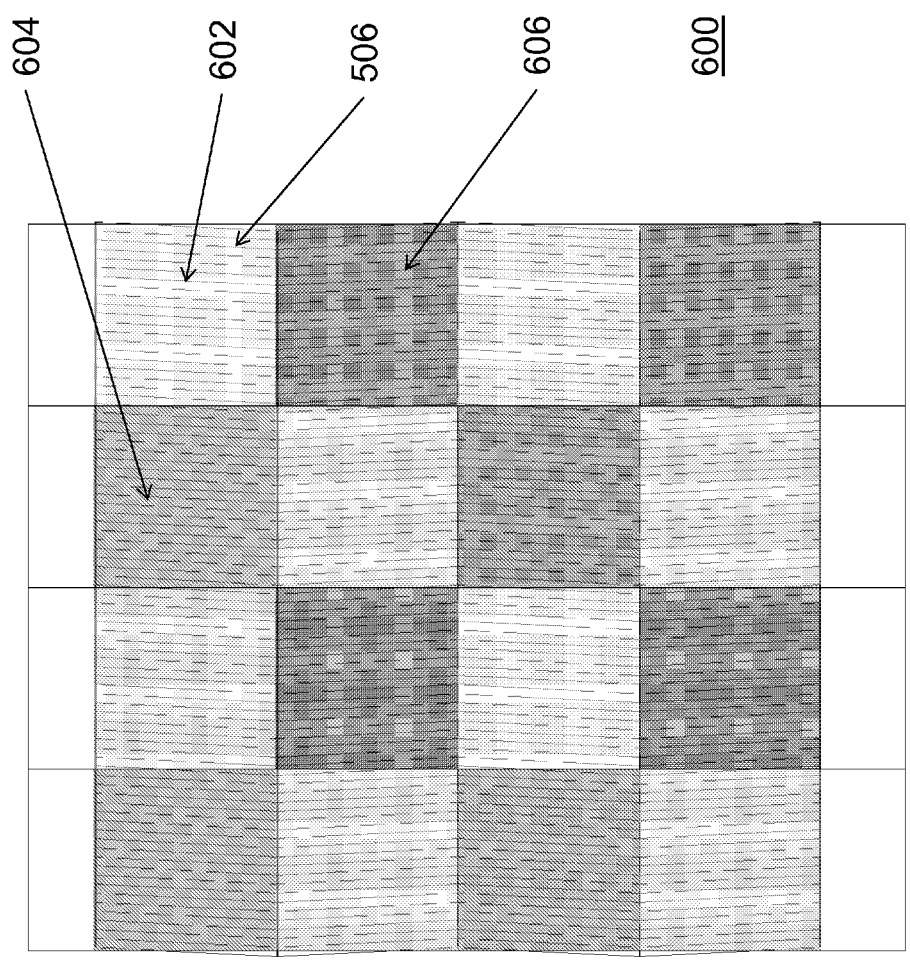
FIG. 14 illustrates a second embodiment of the autostereoscopic display system of the present disclosure.
Figure 15B:
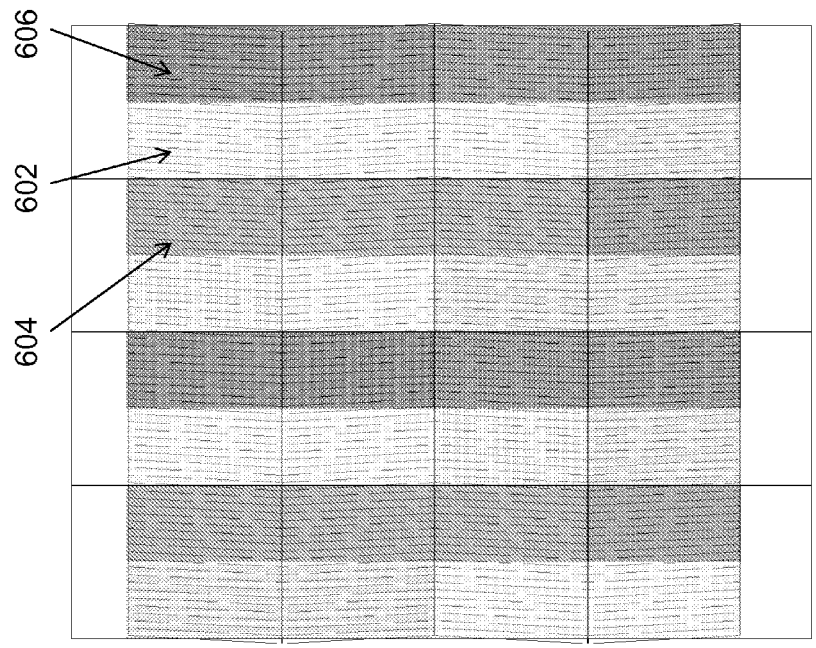
FIG. 15B shows a fourth embodiment of the autostereoscopic display system of the present disclosure.
Figure 15A:
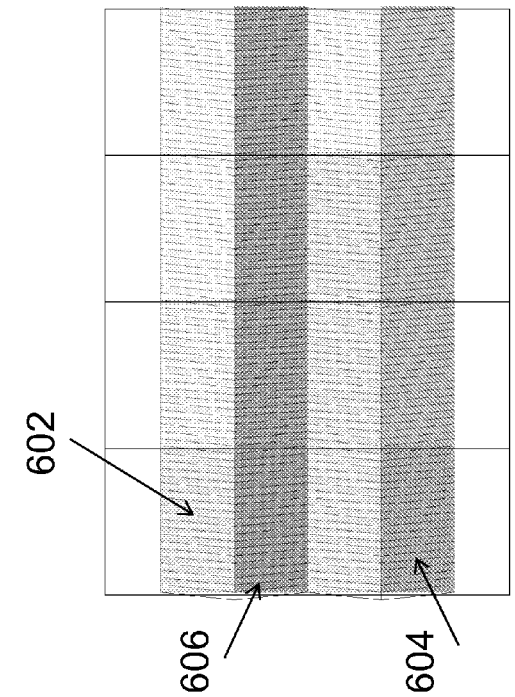
FIG. 15A shows a third embodiment of the autostereoscopic display system of the present disclosure.

Turning now to FIGS. 14-19, several exemplary embodiments according to the principles of the present disclosure are provided. A display system 600 is illustrated in FIG. 14, and in this embodiment, the subpixels 506 are arranged to form green, blue, and red effective pixels 602, 604, and 606 that implement the 'Bayer' color arrangement. The effective pixels 602, 604, and 606 of the display system 600 may also be arranged in patterns similar to those shown in FIGS. 15A and B. In these embodiments, continuous color stripes of green effective pixels 602 provide a uniform square green sampling array, but the red and blue sampling arrays formed by red and blue effective pixels 606 and 604 are reduced either in vertical or horizontal dimensions.

Figure 16:
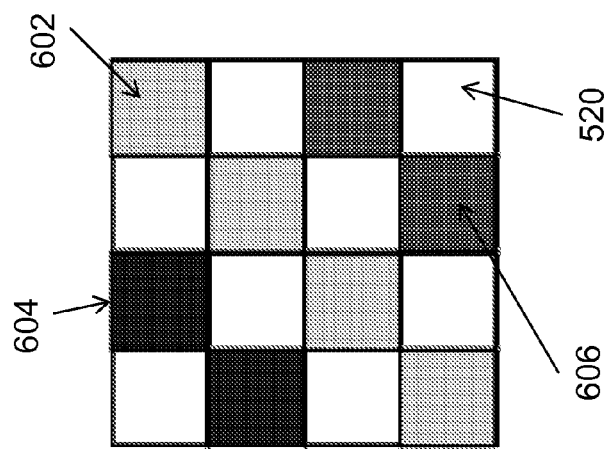
FIG. 16A shows a fifth embodiment of the autostereoscopic display system of the present disclosure.
FIG. 16B shows a sixth embodiment of the autostereoscopic display system of the present disclosure.
FIG. 16C shows a seventh embodiment of the autostereoscopic display system of the present disclosure.
Figure 16:
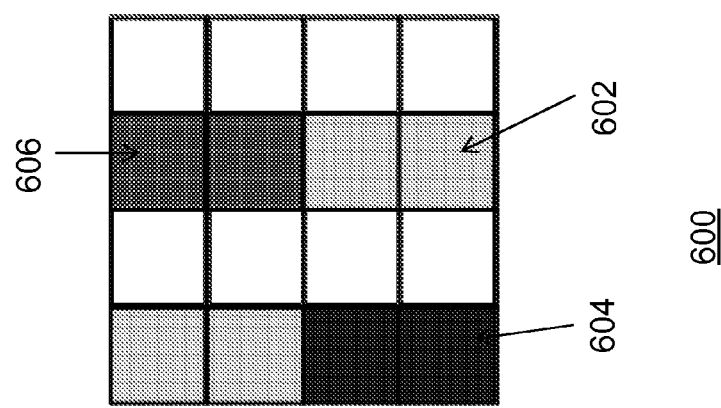
Figure 16:
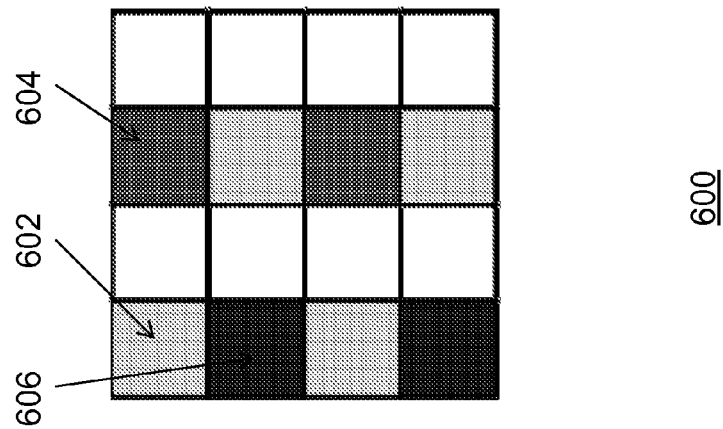

It is to be appreciated that the principles of the present disclosure may be adapted for alternative colors other than red, green, and blue. FIG. 16, for example, shows example color patterns that include white effective pixels 520, which have been proposed by Kodak for digital camera sensors. Another embodiment may include horizontal arrays of subpixels below color filter arrays with aligned overlying lenses.

Figure 17:
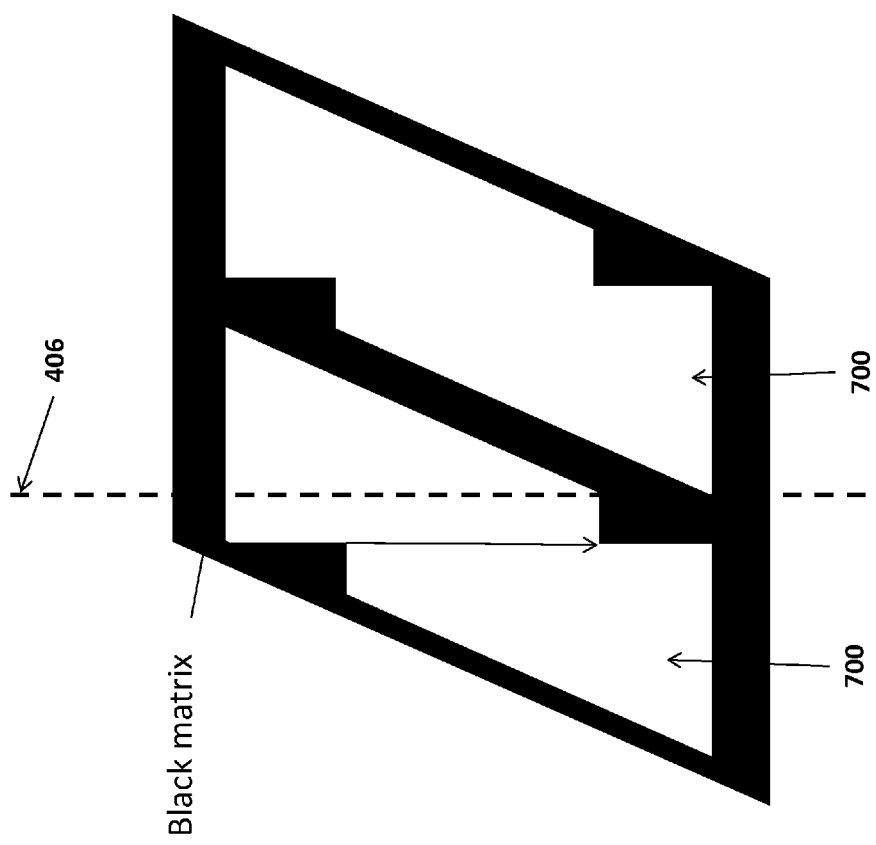
FIG. 17 shows an exemplary embodiment of oblique pixels according to the present disclosure.

Another embodiment of the present disclosure may be directed to using any of the above discussed color patterns and oblique pixels while employing a another masking scheme shown in FIG. 17. The oblique pixels 700 designed according to the masking scheme of FIG. 17 allow the intensity as a function of viewing angle to remain constant, because the intersection of any projected center line 406 of the overlying lens and the clear aperture the pixels 700 remains constant. Other embodiments may include oblique pixels with a fixed masking pattern. In this case, the slant angle of the pixels could be increased slightly to minimize moiré fringing.

Figure 18:
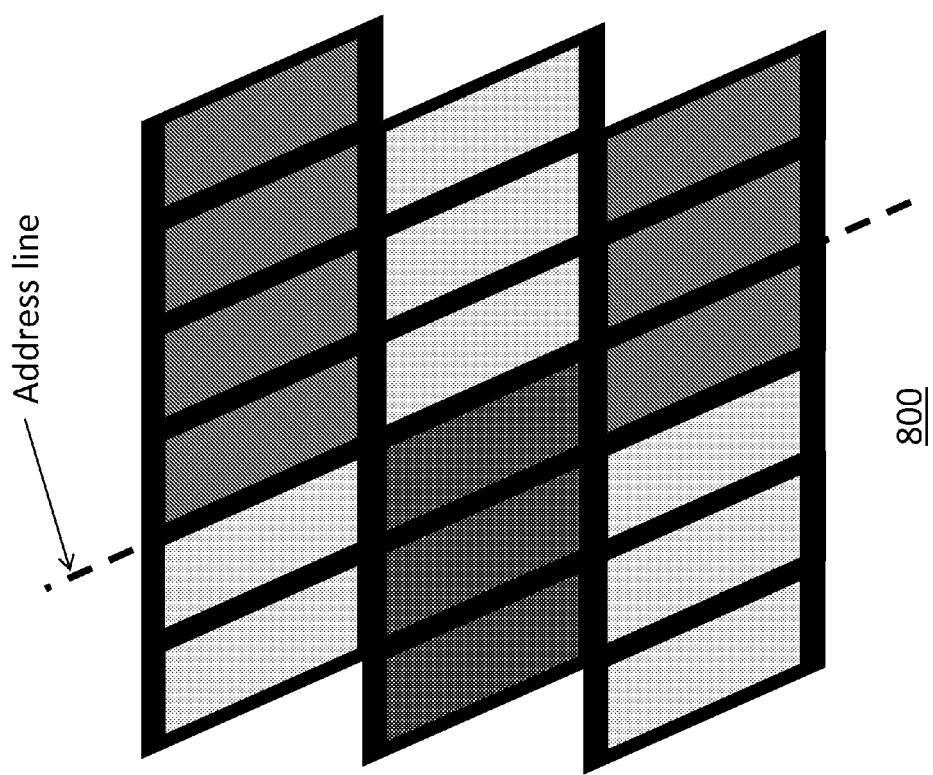
FIG. 18 shows an exemplary embodiment of the autostereoscopic display system of the present disclosure.
Figure 19:
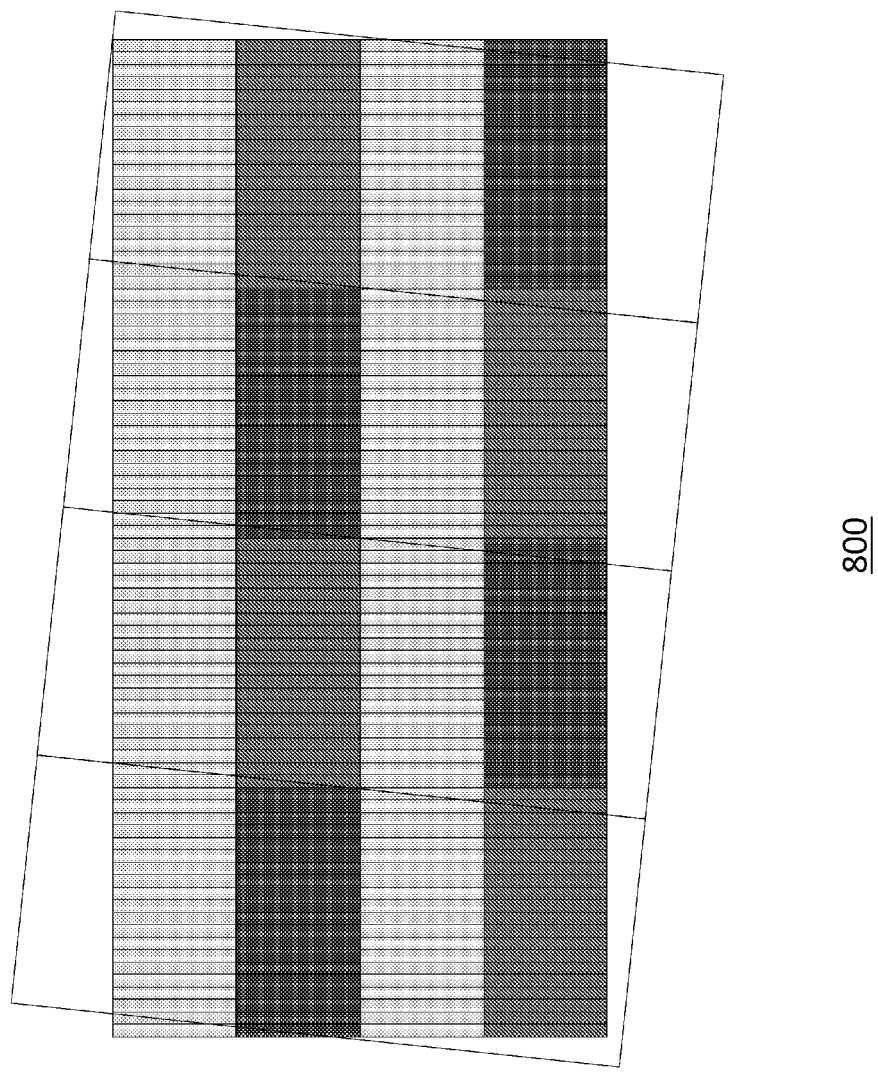
FIG. 19 illustrates another exemplary embodiment of the autostereoscopic display system of the present disclosure.

Yet another embodiment may include a light-modulating display panel 800 having oblique pixels 506 arranged in straight, though tilted columns, as shown in FIG. 18. Here the color sampling arrays are staggered.

Another approach would be to retain the non-oblique pixels and tilt the lenses as used in conventional autostereoscopic lenticular systems. The advantages of such a display system include the convenience of rectangular pixel arrays and the very low angle required to merge adjacent views. Such a low angle might not compromise text sufficiently to warrant concern. An example of this embodiment is the display system 900 shown in FIG. 19.

While various embodiments in accordance with the principles disclosed herein have been described above, it should be understood that they have been presented by way of example only, and not limitation. Thus, the breadth and scope of the invention(s) should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. An autostereoscopic display system comprising:
a light-modulating display panel comprising a ratio of subpixels with a first luminance to subpixels with a second luminance and a ratio of subpixels with a first luminance to subpixels with a third luminance, wherein the first luminance is greater than the second luminance and the third luminance, and the ratios are greater than 1; and
a lenticular sheet disposed in light paths of the subpixels with the first luminance, the subpixels with the second luminance, and the subpixels with the third luminance;
wherein the subpixels with the first luminance, the subpixels with the second luminance, and the subpixels with the third luminance are arranged in a pixel array comprising a plurality of rows and columns, wherein a first row of the pixel array comprises adjacent subpixels with the first luminance and another row of the pixel array comprises the subpixels with the second luminance adjacent to the subpixels with the third luminance.

2. The display system of claim 1, wherein a color of the subpixels with the first luminance is green.

3. The display system of claim 1, wherein the lenticular sheet comprises a lens array having a plurality of rows and columns that are aligned at oblique angles relative to the rows and columns of the pixel array.

4. The display system of claim 1, wherein every other row of the pixel array comprises subpixels with the first luminance.

5. The display system of claim 4, further wherein each of the remaining rows of the pixel array comprises alternating blocks of subpixels with the second luminance and subpixels with the third luminance.

6. The display system of claim 1, wherein each subpixel of the display panel is oblique.

7. The display system of claim 6, wherein the subpixels with the first luminance and the subpixels with the second luminance are arranged in a Herring-bone pattern.

8. The display system of claim 6, wherein the columns of the pixel array are tilted.

9. A light-modulating display panel comprising a plurality of oblique subpixels arranged in a pixel array, the pixel array comprising columns and rows, wherein:
the plurality of oblique subpixels comprise subpixels with a first luminance, subpixels with a second luminance, and subpixels with a third luminance, wherein the first luminance is greater than the second luminance and the third luminance, and a ratio of the subpixels with the first luminance to the subpixels with the second luminance and a ratio of the subpixels with the first luminance to the subpixels with the third luminance are greater than 1;
wherein a first row of the pixel array comprises adjacent subpixels with the first luminance and another row of the pixel array comprises the subpixels with the second luminance adjacent to the subpixels with the third luminance.

10. The light-modulating display panel of claim 9, wherein the subpixels with the first luminance and the subpixels with the second luminance are arranged in a Herring-bone pattern.

11. The light-modulating display panel of claim 9, wherein the columns of the pixel array are tilted.

12. The light-modulating display panel of claim 9, wherein a color of the subpixels with the first luminance is green.

13. A method of providing an autostereoscopic display system, comprising:
providing a light-modulating display panel comprising subpixels with a first luminance, subpixels with a second luminance, and subpixels with a third luminance, wherein the first luminance is greater than the second luminance and the third luminance, and a ratio of the subpixels with the first luminance to the subpixels with the second luminance and a ratio of the subpixels with the first luminance to the subpixels with the third luminance are greater than 1; and
disposing a lenticular sheet in light paths of the subpixels with the first luminance and the subpixels with the second luminance;
wherein the subpixels with the first luminance and the subpixels with the second luminance are arranged in a pixel array comprising a plurality of rows and columns, wherein a first row of the pixel array comprises adjacent subpixels with the first luminance and another row of the pixel array comprises the subpixels with the second luminance adjacent to the subpixels with the third luminance.

14. The method of claim 13, further comprising tilting the lenticular sheet relative to the light-modulating display panel.

15. The method of claim 13, wherein the subpixels with the first luminance and the subpixels with the second luminance of the light-modulating display panel are oblique.

16. The method of claim 13, further comprising arranging the subpixels with the first luminance and the subpixels with the second luminance in a Herring-bone pattern.

* * * * *